US010723965B1

(12) United States Patent
Lu et al.

(10) Patent No.: US 10,723,965 B1
(45) Date of Patent: Jul. 28, 2020

(54) PROCESS FOR MAKING BIOFUEL FROM SPENT COFFEE GROUNDS

(71) Applicants: Mingming Lu, Mason, OH (US); Yang Liu, Arlington, TX (US)

(72) Inventors: Mingming Lu, Mason, OH (US); Yang Liu, Arlington, TX (US)

( * ) Notice: Subject to any disclaimer, the term of this patent is extended or adjusted under 35 U.S.C. 154(b) by 25 days.

(21) Appl. No.: 15/792,372

(22) Filed: Oct. 24, 2017

Related U.S. Application Data

(60) Provisional application No. 62/411,750, filed on Oct. 24, 2016, provisional application No. 62/411,762, filed on Oct. 24, 2016.

(51) Int. Cl.
*C10L 5/44* (2006.01)

(52) U.S. Cl.
CPC ............. *C10L 5/44* (2013.01); *C10L 2290/04* (2013.01); *C10L 2290/08* (2013.01); *C10L 2290/24* (2013.01)

(58) Field of Classification Search
CPC combination set(s) only.
See application file for complete search history.

(56) References Cited

U.S. PATENT DOCUMENTS

| 4,544,567 A | 10/1985 | Gottesman |
| 7,612,221 B2 | 11/2009 | Haas et al. |
| 8,591,605 B2 | 11/2013 | Misra et al. |
| 2011/0226602 A1* | 9/2011 | Lu .......................... C01B 32/324 201/7 |
| 2016/0114308 A1* | 4/2016 | Despen ................ B01J 20/0203 502/406 |

FOREIGN PATENT DOCUMENTS

WO  WO-2009015358 A2 *  1/2009  ................ C10L 1/19

OTHER PUBLICATIONS

Petroleum & Other Liquids, Monthly Biodiesel Production Report—U.S. Energy Information Administration, May 31, 2016.
Petroleum & Other Liquids, Monthly Biodiesel Production Report—U.S. Energy Information Administration, May 30, 2014.
(Continued)

*Primary Examiner* — Ellen M McAvoy
*Assistant Examiner* — Chantel L Graham
(74) *Attorney, Agent, or Firm* — Mark F. Smith; Smith Brandenburg Ltd.

(57) ABSTRACT

A system and process for producing biofuel from spent coffee grounds (SCGs) comprises the steps of performing a first operation comprising the steps of obtaining spent SCGs from a source, washing the SCGs, mixing the washed SCGs with an inorganic acid and heating and stirring the washed SCGs to form a SCG slurry without separating coffee oil, drying the SCG slurry, mixing the dried slurry with a solvent and heating the dried slurry and solvent mixture to create a reaction to produce biofuel and residual grounds, and separating the biofuel from the solvent and the residual grounds. The process further includes the step of using an activation agent and heating the residual grounds and the activation agent to create activated residual grounds. Biochar is also produced without activation and heating de-oiled SCGs at lower temperatures without oxygen.

19 Claims, 12 Drawing Sheets

(56) References Cited

OTHER PUBLICATIONS

Coffee: World Markets and Trade, U.S. Dept. of Agriculture, Jun. 2013.
BioDiesel, http://biodiesel.org/using-biodiesel/oem-information, 2018.
Boey, Peng-Lim et al.m Ultrasound aided in situ Transesterification of Crude Palm Oil Absorbed on Spent Bleaching Clay, Energy Conversion and Mgt. 2011, 52(5):pp. 2081-2084.
Bell, Gordon J. et al., Substituting Fish Oil With Crude Palm Oil in the Diet of Atlantic Salmon Affects Muscle Fatty Acid Composition and Hepatic Fatty Acid Metabolism, American Society for Nutritional Sciences, No. 2002, 132(2): p. 222-230.
Benjumea, Pedro et al., Basic Properties of Palm Oil Biodiesel—Diesel Blends, Science Direct, Fuel, 2008, 87(10): p. 2069-2075.
Chabrand, R. M. et al., Destabilization of the Emulsion Formed During Aqueous Extraction of Soybean Oil, J Am Oil Chem Soc, 2008, 85(4): p. 383-390.
Montes D'Oca, Marcelo et al., Production of FAMEs From Several Microalgal Lipidic Extracts and Direct Transesterification of the Chlorella Pyrenoidosa, Science Direct, Biomass and Bioenergy, 2011, 35(4) p. 1533-1538.
Clean Cities Alternative Fuel Price Report, U.S. Dept. of Energy, Jan. 2014.
A Comprehensive Analysis of Biodiesel Impacts on Exhaust Emissions, draft Technical Report, U.S. Envir. Prot. Agency, EPA420-02-001,Oct. 2002.
Ferrari, R. A. et al., Oxidative Stability of Biodiesel From Soybean Oil Fatty Acid Ethyl Esters, Scientia Agricola, 2005, 62 (3): p. 291-295.
Haas, Michael et al., In situ Alkaline Transesterification: An Effective Method for the Production of Fatty Acid Esters From Vegetable Oils, U.S. Dept. of Agriculture, Journal of the American Oil Chemists' Society, 2004, 81(1): p. 83-89.
Haas, Michael et al., Substrate Pretreatment Can Reduce the Alcohol Requirement During Biodiesel Production via in Situ Transesterification, Journal of the American Oil Chemists' Society, 2011, 88(8): p. 1203-1209.
Hailegiorgis, S. M. et al., Enhanced in situ Ethanolysis of Jatropha Curcas L. in the Presence of Cetyltrimethylammonium Bromide as a Phase Transfer Catalyst, Renewable Energy, 2011, 36(9), 2502-2507.
Hailegiorgis, Sintayehu Mekuria, et al., Parametric Study and Optimization of in situ Transesterification of jatropha curcas L Assisted by Benzyltrimethylammonium Hydroxide as a Phase transfer catalyst via Response Surface Methodology, Biomass and Bioenergy, 2013, 49: p. 63-73.
Hirata, Mizuho et al., Absorption of Dyes Onto Carbonaceous Materials Produced From Coffee Grounds by Microwave Treatment, Journal of Colloid and Interface Science, 2002, 254(1) p. 17-22.
Isbell, Terry A. et al., Enrichment of Erucic Acid From Pennycress (*Thlaspi arvense* L.) Seed Oil, Industrial Crops and Products, 2015, 66, p. 188-193.
Islam, M.S. et al., Preparation and Characterization of Activated Carbon From Bio-Diesel By-Products (Jatropha Seedcake) by Steam Activation, Bangladesh Journal of Scientific and Industrial Research, 2012, 47(3): p. 257-264.
Liu, K et al., Evaluation of Three Composting Systems for the Management of Spent Coffee Grounds, Bioresource Technology, 2011, 102(17)p. 7966-2974.
Knothe, Gerhard et al., Methy Esters (Biodiesel) from and Fatty Acid Profile of Gliricidia sepium Seed Oil, J. Am Oil Chem Soc, 2015, 92(5):769-775.
Morris, Eric A. et al., Roles of Sulfuric Acid in Elemental Mercury Removal by Activated Carbon and Sulfur-Impregnated Activated Carbon, Environmental Science and Technolgy, American Chemical Society, 2012, 46(14):7905-7912.
Moser, Bryan R., Influence of Blending Canola, Palm, Soybean, and SUnflower Oil Methyl Esters on Fuel Properties of Biodiesel, Energy and Fuels, 2008, 22(6): 4301-4306.
Biodiesel, America's Advanced Biofuel, National Biodiesel Board, 2018.
Oliveira, Leandro S., Coffee Oil as a Potential Feedstock for Biodiesel Production, Science Direct, Biosource Technol. 2008, 99(8): 3244-3250.
Presto, Albert A., Impact of Sulfur Oxides on Mercury Capture by Activated Carbon, Environmental Sci. & Tech., 2007, 41(18): 6579-6584.
Ramos, Maria Jesus, Influence of Fatty Acid Composition of Raw Materials on Biodiesel Properties, Bioresource Tech. 2009, 100(1):261-268.
Sarin, Rakesh et al., Jatropha-Palm Biodiesel Blends: An Optimum Mix for Asia, Fuel 2007, 86(10):1365-1371.
Sanchez, Angel et al., Influence of n-Hexane on in Situ Transesterification of Marine Macroalgae, Energies, 2012, 5(2):243-257.
Velasques-Orta, S.B. et al., Alkaline in situ Transesterification of Chlorella Vulgaris, Fuel, 2012, 94:544-550.
Wyatt Vistor T. et al., Production of Fatty Acid Methyl Esters via the In Situ Transesterification of Soybean Oil in Carbon Dioxide-Expanded Methanol, Journal of the American Oil Chemists' Society, 2009, 86(10):1009-1016.
Xu Ruoyu et al., Simplifying the Process of Microalgal Biodiesel Production Through in Situ Transesterification Technology, J. Am Oil Chem Soc., 2011, 88(1):91-99.
Tu, Qingshi, Assessment of Selected Sustainability Aspects of Biodiesel Production: Water and Waste Conservation, Sochool of Energy, Environmental, Biological and Medical Engineering, U. of Cincinnati, Thesis, 2012.
Valderez Ponte Rocha, Maria et al., Ultrasound-Assisted Production of Biodiesel aand Ethanol From Spent Coffee Grounds, Biosource Technology 2014, 167 343-348.
Banerjee, Aditi et al., Combi-Protein Coated Microcrystals of Lipases for Production of Biodiesel From Oil From Spent Coffee Grounds, Sustainable Chemical Processes, 2013 1:14.
Kartika, Amalia et al., Biodiesel Production From Jatropha Seeds: Solvent Extraction and In Situ Transesterification in a Single Step, http://dx.doi.org/10.1016/j.fuel.2013.01.021.
Coffee: World Market and Trade, U.S. Dept. of Agriculture, Jun. 2016.
Deligiannis, A. et al., Waste Coffee Grounds as an Energy Feedstock, Lab. of Fuel Tech. and Lubricants, National Technical Univ. of Athens.
Bendall, Sophie et al., Journal of Chemical Education, American Chemical Society, 2015, 683-687.
Coffee: World markets and Trade, U.S. Dept. of Agriculture, Jun. 2017.
Caetano, Nidia S. et al., Spent Coffee Grounds for Biodiesel Production and Other Applications, Clean Tech. Environ Policy, May 2014.
Carvalho Junior, R. M. et al., Microalgae Biodiesel via In Situ Methanolysis, J. Chem. Tech. Biotechnology 2011, 86(11):1418-1427.
Ginting, M. Surya Abadi et al., Alkaline in Situ Ethanolysis of Jatropha Curcas, SciVerse Sciencedirect, Fuel, 2012, 93:82-85.
Kaul, Savita et al., Parametric Study of Jatropha Seeds for Biodiesel Production by Reactive Extraction, J. Am Oil Chem Soc., 2010, 87(8):903-908.
Coffee: World Markets and Trade, U.S. Dept. of Agriculture, Jun. 2016.
Phimsen, Songphon et al., Oil Extracted From Spent Coffee Grounds for Bio-Hydrotreated Diesel Production, Energy Conversion and Management 2016, 126:1028-1036.
Chat, Ming, Esterification Pretreatment of Free Fatty Acid in Biodiesel Production, from Laboratory to Industry, Fuel Processing Technology 2014, 125: 106-113.
Calligaris, Sonia et al., Insights Into the Physicochemical Properties of Coffee Oil, Eur. J. Lipid Sci. Technology, 2009, 111(12):1270-1277.
Campos-Vega, Rocio et al., Spent Coffee Grounds: A Review on Current Research and future Prospects, Food Science & Technology 2015, 25:24-36.
Ehimen, E.A. et al., Variables Affecting the In Situ Transesterification of Microalgae Lipids, Fuel, 2020, 89(3): 677-684.

(56) References Cited

OTHER PUBLICATIONS

Haile, Mebrahtu, Integrated Volarization of Spent Coffee Grounds to Biofuels, Biofuel Research Journal, 2014, 2:65-69.
Haas; Michael J. et al., Simplifying Biodiesel Production: The Direct or In Situ Transesterification of Algal Biomass, Eur. J. Lipid Sci. Technology 2011, 113(10):1219-1229.
Johnson, Michael B. et al., Production of Biodiesel Fuel From the Microalga Schizochytrium Limacinum bu Direct Transesterification of Algal Biomass, Eeergy Fuels, 2009, 23(10): p. 5179-5183.
Kasim, Farizul Hafiz, et al., Biodiesel Production by In Situ Transesterification, Biofuels, 2010, 1(2) 355-365.
Haas, Michael J. et al., Mositure Removal Substantially Improves the Efficiency of In Situ Biodiesel Production From Soybeans, J. Amer Oil Chem Soc, 2007, 84:197-204.
Vardon, Derek R., Complete Utilization of Spent Coffee Grounds to Produce Biodiesel, Bio-Oil, and Biochar, American Chemical Society, 2013, 1(10):1286-1294.
Jenkins, Rhodri W. et al., Effect of the Type of Bean, Processing, and Geographical Location on the Biodiesel Produced from Waste Coffee Grounds, American Chemical Society, Energy & Fuels, 2014, 28: 1166-1174.
Kondamudi, Narasimharao, et al., Spent Coffee Grounds as a Versatile Source of Green Energy, J. Agricultural and Food Chemistry, American Chemical Society, 2008, 56(24): 11757-11760.
Feng, Wenguo et al., Sulfurization of a Carbon Surface for Vapor Phase Mercury Removal—II: Sulfur Forms and Mercury Uptake, Carbon, 2006, 44(14): 2998-3004.
Reffas, A. et al., Carbons Prepared From Coffee Grounds by H3PO4 Activation: Characterization and Absorption of Methylene Blue and Nylosan Red N-2RBL, Journal of Hazardous Materials, 2010, 175(1): p. 779-788.
Kante, Karifala et al., Spent Coffee-Based Activated Carbon: Specific Surface Features and Their Importance for H2S Separation Process, J. of Hazardous Materials 2012, 201: p. 141-147.
Calizto, Filipe et al., Synthesis of Fatty Acid Methyl Esters via Direct transesterification with Methanol/Carbon Dioxide Mixtures From Spent Coffee Grounds Feedstock, The Royal Society of Chemistry, Green Chem. 2011, 13:1196-1202.
Abdullh, Mudafer et al., Oil Removal From Waste Coffee Grounds Using Two-Phase Solvent Extraction Enhanced With Ultrasonication, Renerable Energy 2013, 50:965-970.
Djilani, Chahrazed et al., Elimination of Organic Micropollutants by Absorption on Activated Carbon Prepared from Agricultural Waste, Chemical Engineering Journal, 2012, 189-: p. 203-212.
Mekarzia, A et al., Chemical Production and Characterisation of Activated Carbon from Waste Coffee Grounds, Int. J. Environment and Waste Management, 2013, 12(2) p. 154-166.
Namane, A. et al., Determination of the Absorption Capacity of Activated Carbon Made from Coffee Grounds by Chemical Activation with ZnCl2 and H3PO4, Journal of Hazardous Materials, 2005, 119(1): p. 189-194.
Masek, Ondrej et al., A Study on Pyrolytic Gasification of Coffee Grounds and Implications to Allothermal Gasification, Biomass and Bioenergy 2008, 32(1): 78-89.
Spokas, Kurt A. et al., Biochar: A Synthesis of its Agronomic Impact Beyond Carbon Sequestration, J. of Environmental Quality, 2011, 973-989.
Sjostrom, Sharon et al., Activated Carbon Injection of Mercury Control: Overview, Fuel, 2010, 89:1320-1322.
Zhang, Hongjie et al., Sulfur-Enriched Biochar as a Potential Soil Amendment and Fertiliser, Soil Research, 2016.
McLaughlin, Hugh et al., An Overview of the Current Biochar and Activated Carbon Markets, biofuelsdigest.com, 2016.
Pendergrast, Mark, Uncommon Grounds, The History of Coffee and How it Transformed Our World, Basic Books, 1999, New York, NY.
Liu, Yang et al, Direct Transerterification of Spent Coffee Grounds for Biodiesel Production, Fuel, 2017, 199:157-161.
Caetano, Nidia S. et al., Spent Coffee Grounds for Biodiesel Production and Other Applications, Clean Techn Envirin Policy, Springer-Verlag Berlin Heidelberg, 2014.
Gui, M.M et al., Feasibility of Edible Oil vs. Non-Edible Oil vs. Waste Edible Oil as Biodiesel Feedstock, Energy 2008 33(11): p. 1646-1653.
Kwon, Eilhann et al., Sequential Co-Production of Biodoesel and Bioethanol with Spent Coffee Grounds, Bioresource Technology 2013, 136: p. 475-480.
Al-Hamamre, Zayed et al., Oil Extracted from Spent Coffee Grounds as a Renewable Source for Fatty Acid Methyl Ester Manufacturing, ScienceDirect, Fuel 2012, 96,70-76.
Couto, Ricardo M. et al., Supercritical Fluid Extraction of Lipids from Spent Coffee Grounds, ScienceDirect, J. of Supercritical Fluids, 2009, 51:159-166.
Burton, Rachel et al., Evaluation of Two-Step Reaction and Enzyme Catalysis Approaches for Biodiesel Production from Spent Coffee Grounds International Journal of Green Energy, 2010, 7:530-536.
Park, Jeongseok et al., In-Situ Transesterification of Wet Spent Coffee Grounds for Sustainable Biodiesel Production, ScienceDirect, Bioresource Tech. 2016, 221:55-60.
Oliveira, Lendro S. et al., Coffee Oil as a Potential Feedstock for Biodiesel Production, ScienceDirect, Bioresource Tech. 2008, 99:3244-3250.
Canakci, M. et al., Biodiesel Production from Oils and Fats with High Free Fatty Acids, Soil & Water Div. of ASAE, 2001, 44(6):1429-1436.
Prabaningrum, N et al., In-Situ Transesterification of Jatropha Curcas Seeds Using the Mixture of Methanol and Isopropanol, National Postgraduate Conference (NPC), 2011, 2011 IEEE.
Fujit A., Coffee Grounds Give Jolt to Crippled Japanese Energy Grid, ABC News, 2011 Tokyo.
Oliveira, L. S. et al., proximate Composition and Fatty Acids Profile of Green and Roasted Defective Coffee Beans, LWT-Food Service and Technology, 2006, 39(3): p. 235-239.
Haas, M.J. et al., The General Applicability of In Situ Transesterification for the Production of Fatty Acid Esters From a Variety of Feedstocks, Journal of the American Oil Chemist's Society, 2007, 84(10): p. 963-970.
Caetano Nidia S. et al., Valorization of Coffee Grounds for Biodiesel Production, Chemical Engineering, 2012 267-272.

* cited by examiner

FIG. 1                                          PRIOR ART
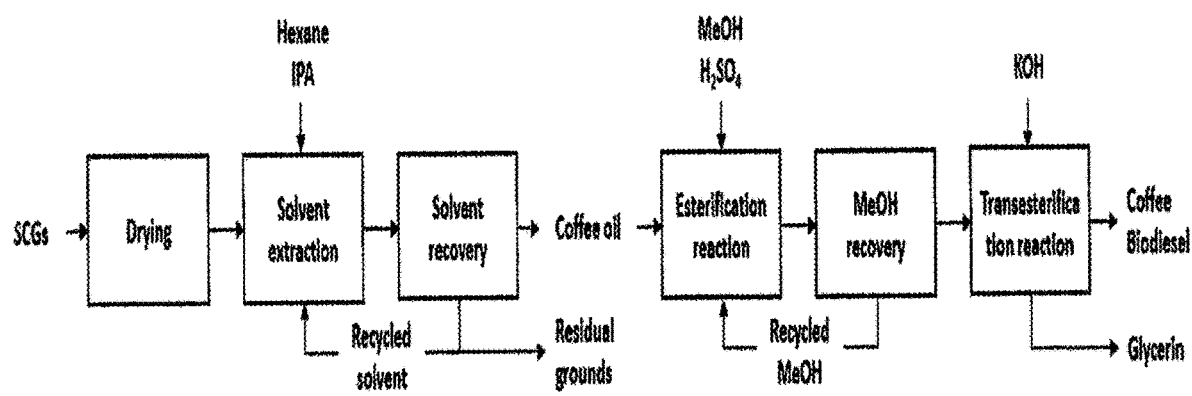
Conventional three-step method
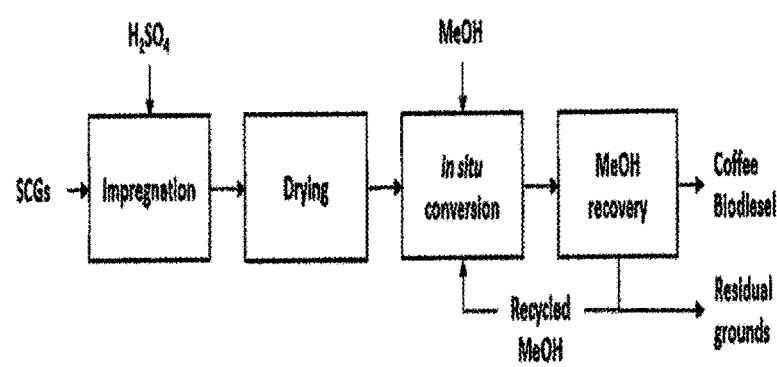
FIG. 7

The effect of reaction temperature on coffee biofuel yield and acid value, 20 wt.% $H_2SO_4$ mixed with the SCGs and the reaction time was 17 hours The effect of various sulfuric acid concentrations and different reaction time on the yield of coffee biofuel, the dotted line represented a maximum point of coffee oil yield (17.32 wt.%).

The acid value of coffee biofuel was influenced by the concentration of sulfuric acid and reaction time, the dotted line represented the ASTM standard of 0.5 mg KOH/g biofuel Coffee biofuel yield from 20 wt.% $H_2SO_4$ mixed with SCGs with a reaction temperature of 70 °C, the dotted line represented a maximum point of coffee oil yield (17.32 wt.%).

The acid value of coffee biofuel made from 20 wt. % $H_2SO_4$ mixed with SCGs with a reaction temperature of 70 °C, the dotted line represented the ASTM D6751 standard of 0.5 mg KOH/g biofuel

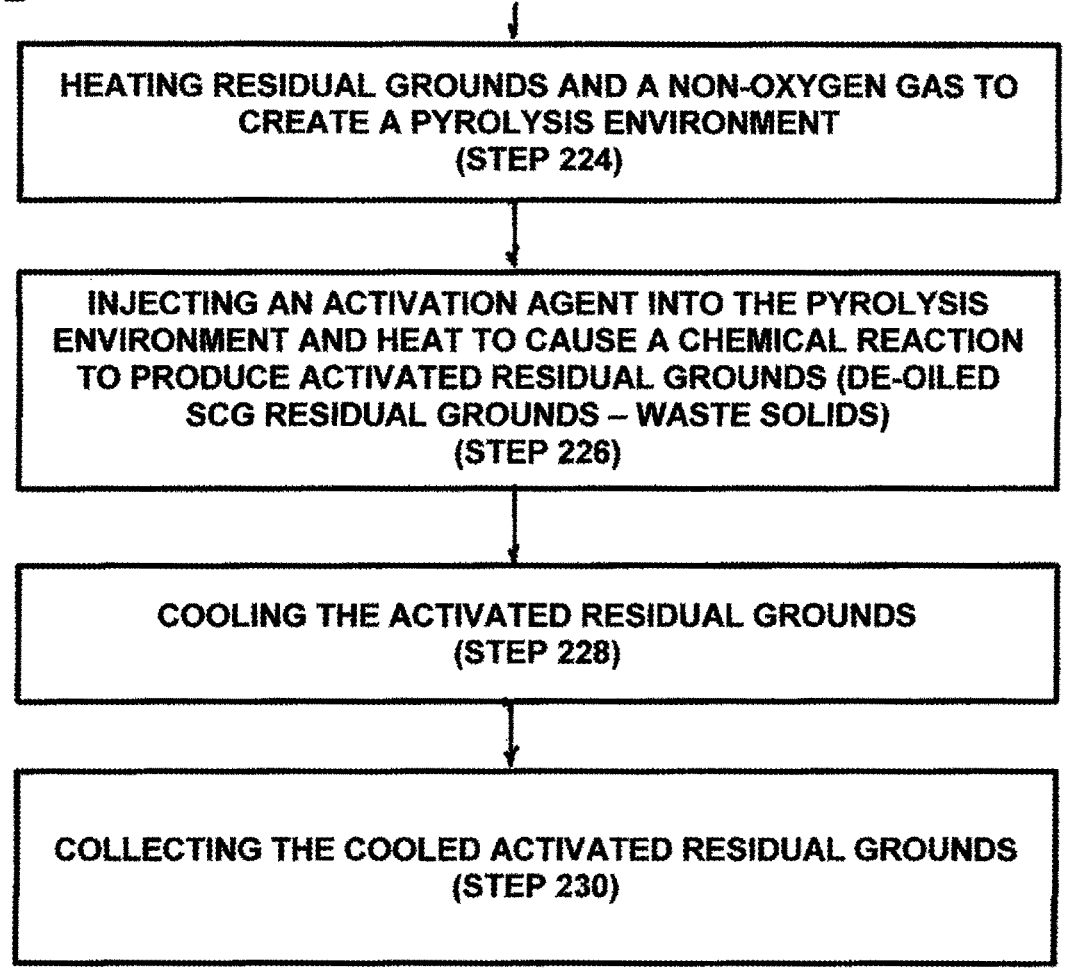

PROCESS FOR MAKING BIOFUEL FROM SPENT COFFEE GROUNDS

CROSS-REFERENCE TO PRIOR APPLICATION

This application is claims benefit to U.S. Provisional Patent Application Ser. No. 62/411,750 filed Oct. 24, 2016 and to U.S. Provisional Patent Application Ser. No. 62/411,762 filed Oct. 24, 2016, both of which are incorporated herein in their entirety by reference.

BACKGROUND OF THE INVENTION

The rapidly increasing use of fossil fuels worldwide depletes the finite supply and raises major concern over the associated greenhouse gases emissions and air pollutants. As reported by the United States Environmental Protection Agency, the emission of particulate matter from burning B20 (20% by volume of biodiesel and 80% by volume of petroleum diesel mixture) would decrease by approximately 10% in comparison with emission from burning regular fuel, such as diesel. Also, the emission of carbon monoxide and hydrocarbons would decrease 21.1% and 11%, respectively. As a result, the demand for renewable energy in the form of biodiesel as an alternative has increased dramatically. Approximately 2.1 billion gallons of biodiesel have been introduced into the American fuel market in 2016. Purified biodiesel, which meets the biodiesel standard (ASTM D 6751) can be directly used in the diesel engine. Modification of diesel engine is not essential when running with biodiesel fuel. Furthermore, most major engine companies affirm in their Original Equipment Manufacturers (OEMs) that using blends up to B20 will not void the engine warranties.

The major feedstock for the biodiesel industry in the United States includes soybean oil, canola oil, white/yellow grease, and tallow and many more. Moreover, 54.32% of total biodiesel feedstock consumed in December 2013 came from soybean oil. With the growing demand for soybeans in both food and fuels, the price of soybeans has increased as well. This price pressure is relevant because the feedstock cost for producing biodiesel is approximately 70%-95% of the total cost leading to a high sales price for biodiesel. The price of biodiesel hit a historic high of $4.81 per gallon in 2008. Because of the economic downturn, Renewable Fuel Standard (RFS) 2 uncertainty, and the lapse of the biodiesel tax credit, the price of biodiesel reached a new record. In order to make the biodiesel price more competitive with diesel price, studies to assess the feasibility of using inexpensive waste materials as feedstock for biodiesel production need to be undertaken.

Coffee is the second largest traded commodity worldwide. The world's coffee production in 2016/2017 is estimated to be 9.54 million tones according to USDA's report, and coffee consumption in the United States is approximately 1.7 million tons. Up to 0.91 g of spent coffee grounds (SCGs) can be generated per gram of coffee. According to a recent study, 8%-20% by weight of oil is found within SCGs. Also, SCGs have a minimum cost of acquisition, and hence, if used as an alternative feedstock for biodiesel production, would reduce the high price of feedstock in the biodiesel industry. Since the SCGs oil proportion is similar to the soybean oil percentage (about 20% by weight), SCGs have sufficient oil content to be used as a feedstock to produce biodiesel.

During biodiesel production, purification is necessary to purify the crude biodiesel. The most common materials that are used during biodiesel purification are Purolite PD206 ion exchange resin and magnesol adsorbents. However, these two types of materials are expensive. In order to minimize the cost of biodiesel production thereby increasing its demand, lower cost purification materials are required.

Reutilizing the SCGs have also been considered as biodiesel feedstock, as well as solvent recovery, where coffee oil was first extracted from SCGs by a solvent extraction process. Solvents such as hexane or a hexane/isopropanol mixture are commonly used in the process. After oil extraction, a two-step process, acid esterification followed by alkaline transesterification, is performed to convert the oil into biodiesel. One such process is shown in FIG. 1 where SCGs are gathered and dried to remove water. Solvents, such as hexane and isopropyl alcohol (IPA) is mixed with the dried SCGs and thereafter recovered to produce coffee oil which is separated from the residual grounds (solids). The coffee oil is them mixed with additional solvents such as methanol (MeOH) and sulfuric acid ($H_2SO_4$) and subjected to an acid-base esterification reaction. The methanol is then recovered and the remaining material is mixed with potassium hydroxide solvent (KOH) and subjected to a transesterification reaction to produce biofuel and glycerin. Unfortunately, such processes require two solvent recovery processes which are relatively expensive due to the need to use technology such as vacuum distillation. As shown, first such process is needed to remove the oil extraction solvents, such as hexane or a mixture of hexane and isopropyl alcohol. While the mixture solvent is used to obtain higher coffee oil extraction efficiency, it makes recycling more difficult due to different boiling points/vapor pressures. The second process is needed to complete the process of producing biofuel. Unfortunately, the complexity in this three-step process (solvent extraction, esterification and transesterification) to make biodiesel from SCGs is costly to adopt and reduces the ability of biodiesel from spent coffee to be economically competitive. Therefore, the solvent extraction process is viewed as a "tough sell" to the biodiesel industry due to its high cost and added safety requirements in chemical handling.

Another process for producing biodiesel from spent coffee grounds is shown and described in U.S. Pat. No. 8,591,605 that uses a solvent extraction method to obtain coffee oil. Solvent is removed, such as by boiling off or vacuum distillation, and a transesterification reaction is used to create biodiesel. Unfortunately, this system has limited use due to disadvantages of the solvent extraction process similar to other published journal papers.

One approach is described in U.S. Pat. No. 7,612,221 whereby fatty acid alkyl esters were produced by transesterifying a feedstock containing lipid-linked fatty acids with an alcohol and an alkaline catalyst to form the fatty acid alkyl esters. However, this patent is focused on intact plant seeds and fruits, and include soy, coconut, corn, cotton, flax, palm, rapeseed/canola, safflower, sunflower and the like. In addition, it also uses an alkaline catalyst to form the fatty acid alkyl esters. Other approaches used a combination of solvents, such as methanol and chloroform to create a transesterification reaction with spent coffee grounds. However, the use of methanol and chloroform co-solvents makes solvent recovery more expensive and the use of recovery methods, such as vacuum evaporation often results in changes to the final composition. Further, the use of such co-solvents makes the process more difficult for large volume production.

SGCs have also been converted into activated carbon which have been used to capture water pollutants, including $H_2S$, organic pollutants such as p-nitrotoluene and n-nitrophenol and methylene blue (to represent dyes). SCGs have a low ash content of 3.5 wt. %, which is much lower than other agricultural waste which favors micro-porosity. Bio-char is becoming increasingly recognized as a significant resource to inexpensively increase agricultural production efficiency.

Bio-char does this by: (1) increasing soil moisture retention; (2) moderating soil acidity; (3) increasing soil nutrient retention; (4) reduced leaching of beneficial nitrogen into ground water; (5) increasing soil microbial activity; and (6) decreasing plant pathogens. Because biochar does not undergo the "activation" step which is required for the production of high surface area carbons, they typically have residual carboxylic acid functionalities remaining in their structure which results in a significant amount of ion exchange capacity. This cation exchange capacity is primarily responsible for the improvements in increased soil fertility and crop yields.

There are several environmental benefits of biochar including the retention of phosphorous to reduce contamination of surface waters due to nutrient runoff, and biochar is considered carbon negative and has potential as a $CO_2$ sequester material Biochar also has the advantage of being produced at a significantly lower price than other soil amendments with similar benefits. Further, biochar has the potential to be produced in bulk quantities relatively cheaply because of the wide variety of high volume biomass material that can be used as feedstock. The low ash (less than 4%) and low contaminant level of SCGs are expected to provide a higher yield of final product when compared to other feedstocks. Biochar produced from products such as SCG available in densely populated cities can be used locally as an amendment for increasing common urban farming, vegetative roofs, and indoor growing facilities and thereby reduce the transportation cost of the raw materials and of the final product to users. Mild pyrolysis (e.g., temperatures less than 600° C.) is generally employed to produce biochar and have been shown to be the most effective production method. Pyrolysis is the heating of degradable material in the absence of oxygen, and results in a high carbon containing solid product. Pyrolysis has been used extensively for the production of activated carbon, and for producing biochar from plant materials. However, until now, there has not been an optimal process developed to efficiently produce high quality biochar from SCGs.

In view of the foregoing, it would be desirable to have a process of producing biofuel from spent coffee grounds (SCGs) that is significantly less costly and time consuming, and whereby residual SCG solids are developed into carbon products, such as biochar or activated carbon, which further increases the financial feasibility of utilizing SCGs.

SUMMARY OF THE INVENTION

The subject invention is a new and novel system and process for producing bio-products by reusing spent coffee grounds (SCGs). In a preferred embodiment the process comprises two operations. The first operation includes obtaining a lipid content from SCGs for producing biofuel. The second operation includes producing carbon products from de-oiled SCGs, such as biochar or activated carbon specialized for mercury control. The system and process of the subject invention, as compared to prior-art solvent extraction processes, is more cost effective, is highly efficient and environmentally friendly.

The system and process of the subject invention utilizes a transesterification method to directly obtain biofuel from SCGs without requiring solvent extraction and esterification steps used in prior art systems. In a preferred embodiment, the first operation includes the steps of obtaining spent SCGs and washing the SCGs without moisture removal. The washed SCGs is then coated with an inorganic acid and heated and stirred to form a SCG slurry which is then dried. The dried slurry is then mixed with a solvent and placed within a reactor and heated to create a reaction. After the reaction, biofuel is separated from the solvent, such as by use a roto-evaporator, and the solvent is then reused.

In a preferred embodiment of the invention the inorganic acid is sulfuric acid.

In another preferred embodiment of the invention the inorganic acid is 5-30 wt. % sulfuric acid.

In another preferred embodiment of the invention the is coated with a 20 wt. % sulfuric acid and heated to about 70° C. for about 1-about 6 hours.

In another preferred embodiment of the invention the inorganic acid is selected from the list consisting of sulfuric acid hydrochloric acid (HCl), nitric acid ($HNO_3$), and organic acidic heterogeneous catalysts.

In another preferred embodiment of the invention the dried slurry and solvent is heated in the reactor to about 70° C. for about 6-about 20 hours, preferably 12 hours.

In a preferred embodiment of the invention the solvent is methanol.

A preferred embodiment of the invention includes the steps of obtaining spent SCGs and washing the SCGs without moisture removal. The washed SCGs is then coated with 20 wt. % sulfuric acid and stirred and heated to about 70° C. for about 3-about 4 hours to form a slurry which is then dried in an oven at about 105° C. for about 24 hours. The dried slurry is then mixed with methanol as a solvent and placed within a reactor and heated at about 70° C. for about 6 to about 20 hours to create a reaction to produce biofuel. After the reaction, biofuel is separated from the methanol, such as by use evaporation. The biofuel is then purified by filtration and water washed.

In another preferred embodiment of the invention, removal of solvents is performed on the waste solids remaining from the production of biofuel from SCGs (residual grounds) and then an activation agent is used and heat is applied to create a chemical reaction to produce activated residual grounds.

In a preferred embodiment of the invention the removal of solvents from the residual grounds is performed using natural evaporation, heating or by use of blowing air.

In a preferred embodiment of the invention the residual grounds after the removal of solvents, are subjected to heating in a non-oxygen gas environment to further remove any solvents from the residual grounds to create a pyrolysis environment and then an activation agent is used and heat is applied to create a chemical reaction to produce activated residual grounds.

In another preferred embodiment of the invention the residual grounds, after solvent removal has been performed, is provided with an activation agent and heated sufficiently to produce activated carbon which is then cooled and used for carbon products.

In a preferred embodiment of the invention the activation agent is carbon dioxide ($CO_2$).

In a preferred embodiment of the invention the activation agent includes one or more activation agents selected from the list consisting of carbon dioxide, water vapor and nitrogen, zinc chloride ($ZnCl_2$), phosphoric acid ($H_3PO_4$), nitric acid ($HNO_3$) and hydrochloric acid (HCl).

In another preferred embodiment of the invention, after solvent removal has been performed, is provided with an activation agent and heated to about 600-1000° C. for about 30 minutes-to about 2 hours to produce activated carbon. For biochar production, different pyrolysis temperatures from 400 to 800° C. and heating rates ranging from 1° C./min to 15° C./min are often used, with the residence times varied accordingly. Usually no activation agent is needed. Higher yield can be expected from lower process temperature, while larger surface area is generally produced from higher temperature pyrolysis.

These and other features, aspects, and advantages of the present invention will become better understood with regard to the following description, appended claims, and accompanying drawings.

BRIEF DESCRIPTION OF THE DRAWINGS

These and other features, aspects, and advantages of the present invention will become better understood with regard to the following description, appended claims, and accompanying drawings where:

FIG. 1 is a flow diagram illustrating the prior art method of the three-step process of solvent extraction for producing biofuel using hexane or a hexane/isopropanol mixture to extract oil and whereby after oil extraction, a two-step process of acid esterification is followed by alkaline transesterification to convert the oil into biofuel;

FIG. 7 is a flow diagram showing the direct esterification process of the subject invention for creating biofuel from SCGs;

FIG. 9B is a flow diagram showing the process of the subject invention showing the steps of a second operation for producing activated residual grounds for creating carbon products, such as biochar or activated carbon specialized for mercury control;

DETAILED DESCRIPTION OF THE INVENTION

Figure 2:
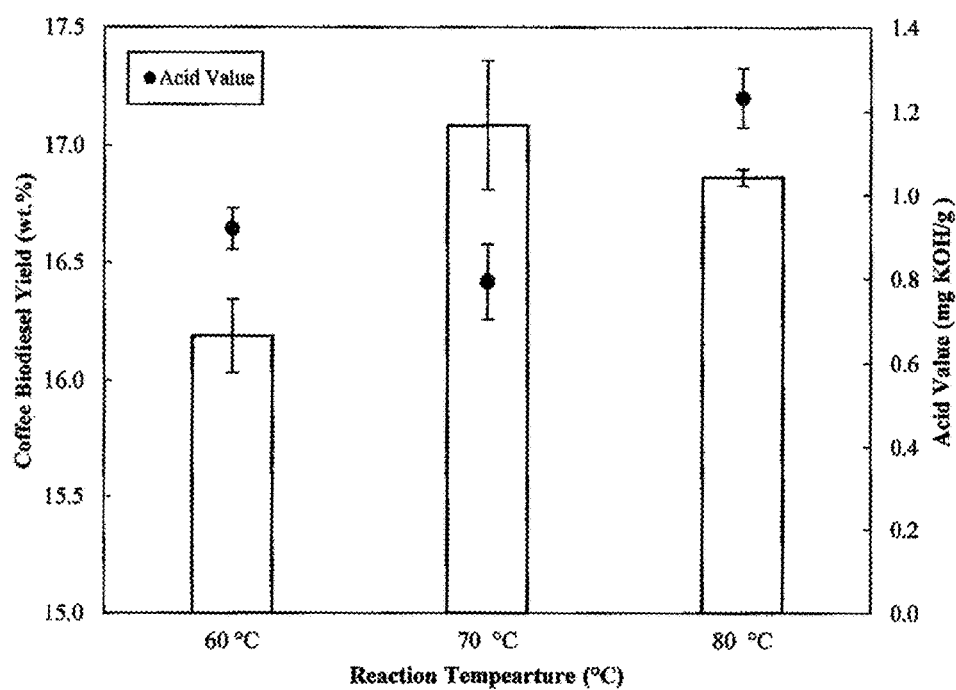
FIG. 2 is a graph showing the effect of reaction temperature on coffee biofuel yield and acid value, 20 wt. % $H_2SO_4$ mixing applied to SCGs with a reaction time of about 17 hours.

The subject invention is a new and novel process of producing biofuel from spent coffee grounds (SCG) that does not require the steps of producing coffee oil thereby saving processing time and expense. Unlike prior systems and processes that first use esterification of the free fatty acids in SCG using acid catalysts, such as sulfuric acid, to convert the free fatty acids into esters and then uses transesterification of the glycerides into esters (biofuel) using alkaline catalysts (NaOH, KOH, or methoxides), the system and process of the subject invention does not require producing coffee oil thereby uses only one reaction step of acid catalyzed transesterification. Further, the subject invention includes the step of coating the SCG solids with sulfuric acid which functions to add sulfate thereby enhancing the produced biochar or activated carbon produced. In describing this and the other preferred embodiments and the various elements of the invention described herein and illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein, the terms "biofuel" includes biodiesel or any other fuel that meets the specifications of the biofuel produced using the subject invention.

The process and system of the subject invention was developed by using spent coffee grounds (SCGs) collected from a locally owned coffee shop. The process and system also applied to SCGs collected from other sources, such as instant coffee producers, restaurants, etc. Solvents used for free fatty acid titration, such as hexane, and isopropyl alcohol were all HPLC grade (Fisher Scientific). Titration indicator, 1 w/v % phenolphthalein solution, was prepared from a phenolphthalein powder in a laboratory. Potassium hydroxide pellets were used for titration.

The process of the subject invention was conducted using a Soxhlet apparatus, and both the distillation flask and extractor were wrapped with heating tapes to maintain the desired reaction temperature. The process of the subject invention can also be carried out in other devices that can enable acid catalyzed transesterification of the SCGs. SCGs were first impregnated (mixed) with the solvent (catalyst) for direct esterification. Since the acid value of coffee oil was higher than 2 mg KOH/g oil (6.18-6.94 mg KOH/g oil), sulfuric acid (95.0 to 98.0 wt. %) was selected as the catalyst to avoid the saponification between free fatty acids and the alkaline catalyst. SCGs (100 g dry weight) were impregnated (mixed) with various concentrations of sulfuric acid (5, 10, 15, and 20% of dry SCGs weight) diluted by de-ionized water. The slurry was heated to 70° C. and stirred for 3 hours, after which the slurry was dried in an oven at 105° C. for 24 hours to remove moisture.

Fifty (50) grams of impregnated SCGs were measured and loaded into a cellulosic thimble. Two hundred fifty (250) ml of methanol was measured and placed in a distillation flask. Scale-up operations are possible with similar SCG to solvent ratios. After transesterification, the reaction mixture (methanol, glycerin, and coffee biofuel) was transported into a rotary evaporator for methanol recovery at 70° C. and moderate vacuum. Thereafter, coffee biofuel was moved into a separatory funnel and 20 ml of pre-heated (80° C.) de-ionized water was then added to the funnel and the mixture was settled for at least 30 minutes for glycerin separation. Afterwards, the bottom glycerin layer and mid layer of washing water were drained out. More pre-heated de-ionized water was used to wash the coffee biofuel until the pH of the washing water became the same as that of the initial de-ionized water. As a final step, after the washing water was drained, the washed biofuel was placed into a centrifuge (5000 rpm for 30 minutes) to separate any remaining impurities, such as trace amounts of water and fine SCGs particles. Parametric studies were performed based on the reaction temperature (60° C., 70° C., and 80° C.), reaction time (3, 4, 5, 6, 7, 10, 12, and 17 hours), and the catalyst ($H_2SO_4$) dosage (5 wt. %, 10 wt. %, 15 wt. %, 20 wt. %) to determine the optimum operating conditions.

Soxhlet extraction of coffee oil with hexane and isopropyl alcohol (1:1 v/v, 250 ml) was performed to determine the maximum available oil content within the SCGs, which was used as an indicator for reaction completion. Various coffee oil extraction conditions were tested and the optimum extraction condition was 6 hours at 70° C. The AOCS titration method Cd 3d 63 was performed to determine the acid value of both coffee oil and biofuel.

The biodiesel yield was calculated via Equation 1, $$\text{Biofuel Yield \%} = (M_B/M_{SCGs}) \times 100\%$$

Where,
$M_B$: mass of biofuel, g
$M_{SCGs}$: mass of dried spent coffee grounds, g
Also, the oil to biofuel conversion rate was calculated via Equation 2, $$\text{Conversion Rate \%} = (M_B/M_{Oil}) \times 100\%$$

Where,
$M_B$: mass of biofuel, g
$M_{Oil}$: mass of available coffee oil, g

Results

The maximum available oil content within the SCGs was 17.32±0.93 wt. %. The moisture content of the SCGs ranged from 40.93 wt. % to 50.32 wt. %. The acid values of the coffee oil ranged from 6.18 to 6.94 mg KOH/g oil, which suggested that alkaline transesterification alone is not sufficient to make it into biofuel.

FIG. 2 indicates the effect of temperature on the yield of biofuel and its acid value. All samples were impregnated with 20 wt. % $H_2SO_4$ and reacted for 17 hours to ensure complete reaction. An increase of biofuel yield from 60° C. (16.19±0.16 wt. %) to 70° C. (17.08±0.27 wt. %) was observed with a p value of 0.053. However, biofuel yield between 70° C. and 80° C. were not statistically different (p value of 0.559). At 70° C., the average acid value (0.79±0.18) was also the lowest among the three temperatures. Therefore, 70° C. was determined as the optimum reaction temperature of the acid impregnation process of SCGs.

Figure 3:
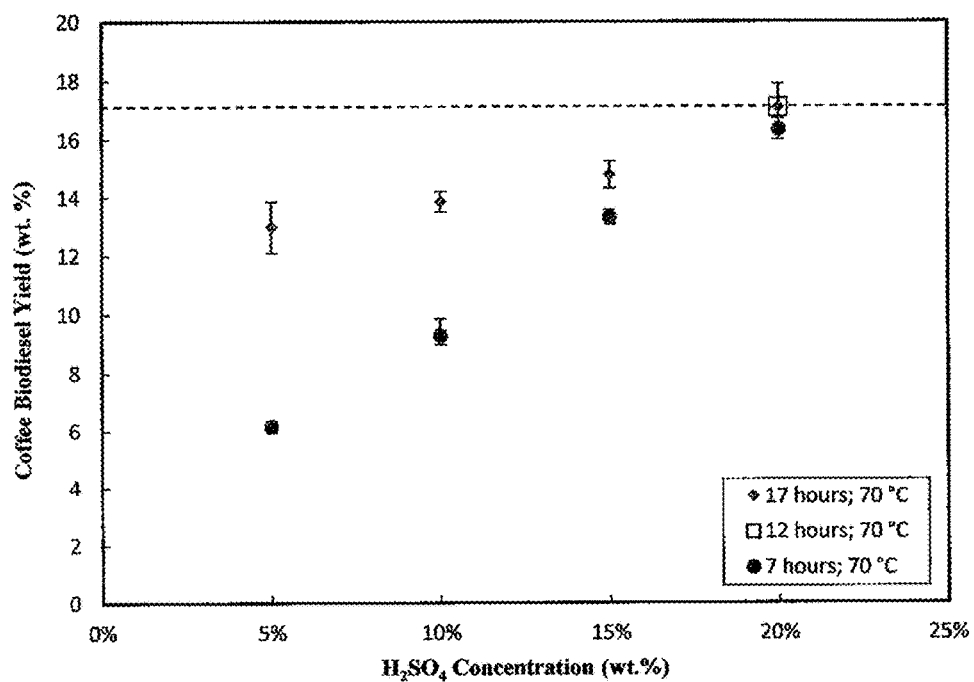
FIG. 3 is a graph showing the effect of various sulfuric acid concentrations and different reaction times on the yield of coffee biofuel, the dotted line represents a mark/maximum point of coffee oil yield (17.32 wt. %)

FIG. 3 shows the effect of sulfuric acid concentration (ranging from 5 wt. % to 20 wt. %) on the coffee biofuel yield. All the samples were reacted at 70° C. and the dotted line represented the coffee oil yield. When impregnating SCGs with higher concentrations of sulfuric acid, the coffee biofuel yield increased. The effect of various sulfuric acid impregnated concentration on the coffee biofuel yield with different reaction time was also studied in FIG. 3. Although the effect of reaction time played an important role in converting coffee oil to coffee biofuel when the impregnated concentration of sulfuric acid was low (5 and 10 wt. %). The effect of reaction time was negligible when the impregnated concentration reached 20 wt. %.

Figure 4:
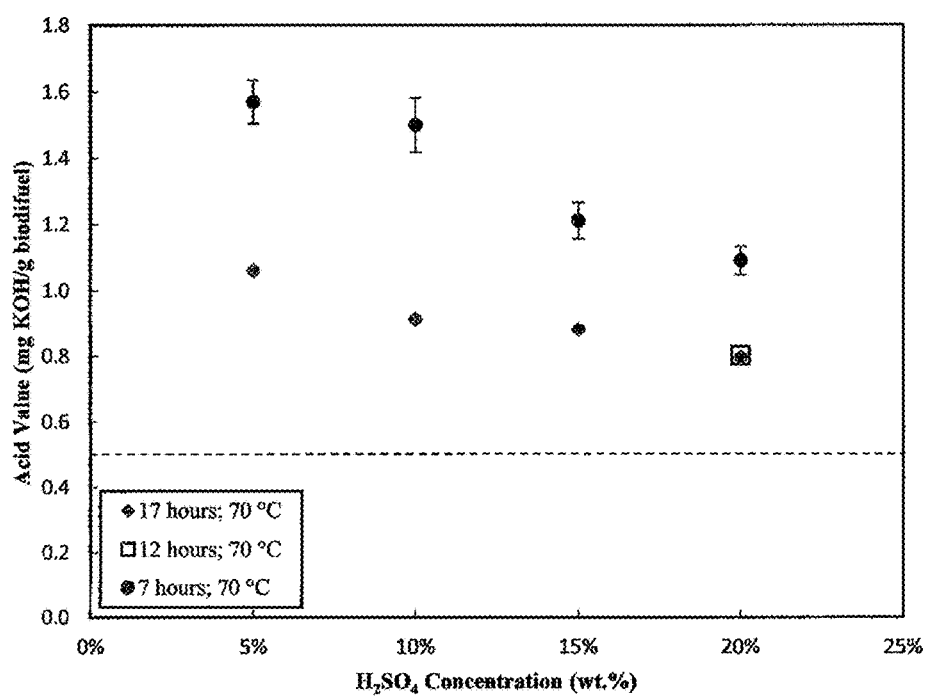
FIG. 4 is a graph showing the acid value of coffee biofuel influenced by the concentration of sulfuric acid and reaction time, the dotted line represents the ASTM standard of 0.5 mg KOH/g biofuel.

The acid value of coffee biofuel decreased as the concentration of sulfuric acid increased as shown in FIG. 4. Although the acid value of both 7-hour sample and 17-hour sample decreased as the impregnated concentration increased, 17-hour sample resulted with a lower acid value at every impregnated concentration point. At the same time, 12-hour sample had a similar acid value with the 17-hour sample, but the reaction time was much shorter. As noticed, all samples did not meet the ASTM D6751 acid value requirement of 0.5 mg KOH/g (doffed line).

Improvements such as alkaline wash could be applied to decrease the acid value. Based on the analysis of FIG. 3 and FIG. 4, 20 wt. % sulfuric acid was chosen to be the best impregnated concentration.

Figure 5:
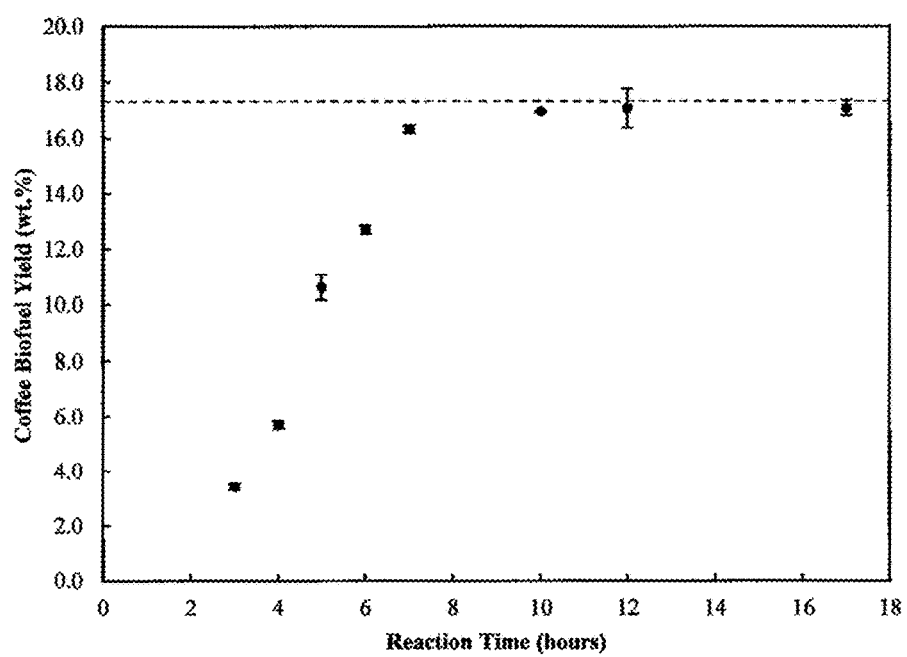
FIG. 5 is a graph showing coffee biofuel yield from 20 wt. % $H_2SO_4$ mixed with SCGs with a reaction temperature of 70° C., the dotted line represents a mark point of coffee oil yield (17.32 wt. %)

FIG. 5 shows the effect of reaction time on the biodiesel yield from the samples of 20% impregnated SCGs with a reaction temperature of 70° C. The increase in yield with the extended reaction time leveled off after the reaction time reached 7 hours. The difference in the average biofuel yield between 7-hour sample and 12-hour sample was 0.76 wt. % (p-value: 0.32). However, as shown in Table 1, the concentration of total glycerol of 7-hour sample was well above the limit (0.24%) of the ASTM D6751 standard, which indicated that the conversion of coffee oil to biofuel was incomplete. Table 1 also demonstrates that both 12-hour and 17-hour samples met the selected ASTM D6751 requirements except the acid value. The figure also shows that the conversion rate of the coffee oil to the coffee biofuel was 98.50 wt. % (coffee oil yield was 17.32 wt. %, which was the dotted line in the figure).

TABLE 1

Summary of the selected ASTM D6751 test results. The coffee biofuel results of 20 wt. % $H_2SO_4$ impregnated SCGs with a reaction temperature of 70° C. and a reaction time of 7, 12, and 17-hour were presented in the table.

| Reaction Time (hours) | 7 | 12 | 17 | ASTM D6751 |
|---|---|---|---|---|
| Mono-glycerides | 2.14% | 0.06% | 0.05% | — |
| Di-glycerides | 40.47% | 0.45% | 0.04% | — |
| Tri-glycerides | 34.74% | 0.08% | 0.03% | — |
| Total Glycerol (mass %) | 10.03% | 0.02% | 0.02% | 0.24 max. |
| Free Glycerol (mass %) | 0.000% | 0.000% | 0.001% | 0.02 max. |
| Kinematic viscosity (40° C.; mm²/s) | — | 5.36 | 5.27 | 1.9-6.0 |
| Oxidation stability (110° C. h; Rancimat; h) | — | 6.62 | 33.42 | 3 min. |
| Acid value (mg KOH/g) | 1.90 | 0.80 | 0.79 | 0.5 max. |

Figure 6:
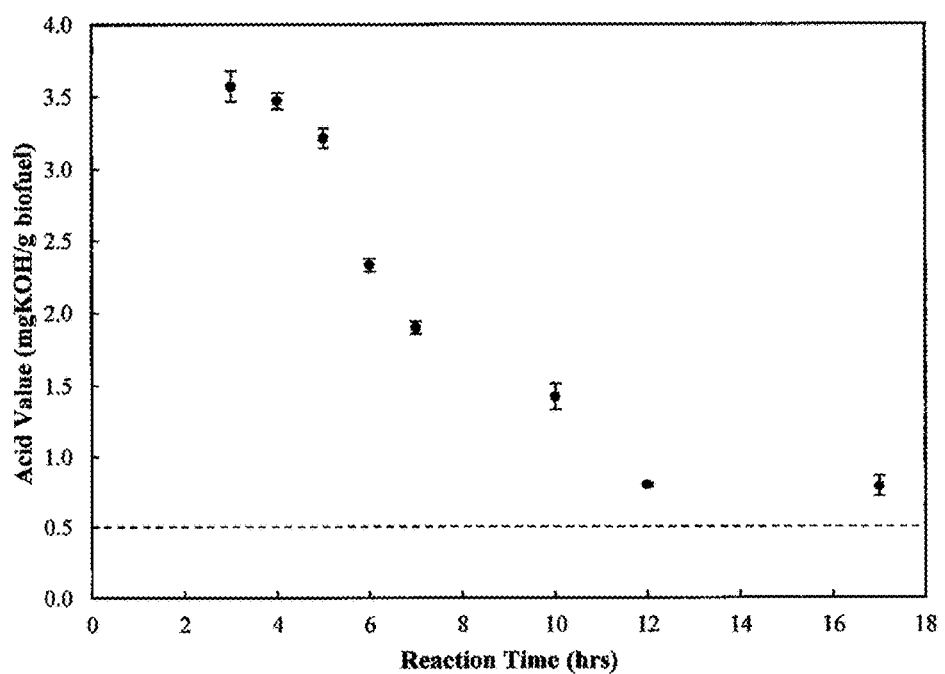
FIG. 6 is a graph showing acid value of coffee biofuel made from 20 wt. % $H_2SO_4$ mixed with SCGs with a reaction temperature of 70° C., the dotted line represents the ASTM D6751 standard of 0.5 mg KOH/g biofuel.

In addition, the acid values of the resulted coffee biofuel with various reaction time were displayed in FIG. 6. Based on concurrently analyzing of FIG. 5 and FIG. 6, while the biofuel yield tended to stay unchanged after 7 hours, the acid value continued to decline. According to ASTM D6751, the maximum allowable acid value in the biofuel should be less than 0.5 mg KOH/g. Although the acid value did not meet the regulation, it could be easily solved by washing the coffee biofuel with the alkaline solution. In addition, the coffee biofuel could mix with a low acid value biofuel so that the mixed product could fulfill the requirement. In order to lower the acid value, 1% NaOH solution was used to wash the 12-hour biofuel sample and the acid value reduced to 0.31 mg KOH/g, which met the requirement.

Biofuel yield and acid value of three critical time points (7, 12, and 17 hours) are summarized in Table 2. The results are shown in FIGS. 2, 3, and 4, show that 20 wt. % $H_2SO_4$ at 70° C. provides the best transesterification reaction. Table 2 illustrates the yield of coffee biofuel between 12-hour and 17-hour samples were close, while the 7-hour sample was lower than the other two samples. Also, the acid value of the 7-hour sample was close to 2.0 mg KOH/g biofuel while 12-hour and 17-hour samples were similar and both of them were approximately 0.80 KOH/g biofuel. Based on the coffee biofuel yield, acid value, and time consuming, it was determined that 12 hours is the optimized reaction time.

TABLE 2

Comparison of the biofuel yield and acid value between three critical time points. The reaction temperature was set to be 70° C. for all samples. 20 wt. % $H_2SO_4$ impregnated SCGs were used.

| Samples | Biodiesel Yield (wt. %) | Acid Value (mg KOH/g biodiesel) |
| --- | --- | --- |
| 7 hours | 14.66 ± 0.12 | 1.90 ± 0.04 |
| 12 hours | 17.06 ± 0.70 | 0.80 ± 0.01 |
| 17 hours | 17.08 ± 0.27 | 0.79 ± 0.07 |

The FAME (fatty acid methyl ester) composition of the coffee biofuel obtained from the optimum condition including the following: C16:0 (44.3%), C18:0 (8.8%), C18:1 (6.1%), C18:2 (30.8%), C20:0 (3.3%), C22:0 (0.3%). Coffee biofuel produced through the subject process contained mainly C16:0 and C18:2.

The total biofuel production time of the subject process is comparable with the total biofuel production time of conventional methods. Also, the yield of coffee biofuel gives a 17.06±0.70 wt. % coffee biofuel yield and equals to a 98.50 wt. % coffee oil to coffee biofuel conversion rate under 70° C. and 12 hours via 20 wt. % $H_2SO_4$ impregnated SCGs. It was found that the produced coffee biofuel has a FAME profile that mainly contained C16:0 and C18:2. In a preferred embodiment of the invention the reaction condition is at 70° C. and about 6-about 20 hours using 20 wt. % sulfuric acid ($H_2SO_4$) mixed with the SCGs. It was found that the yield of coffee biofuel using the process of the subject invention reached 17.06±0.70 wt. % with an acid value of 0.31 mg KOH/g after alkaline washing. The corresponding conversion rate of coffee oil to coffee biofuel was found to be 98.50 wt. % under the preferred reaction condition.

Figure 8A:
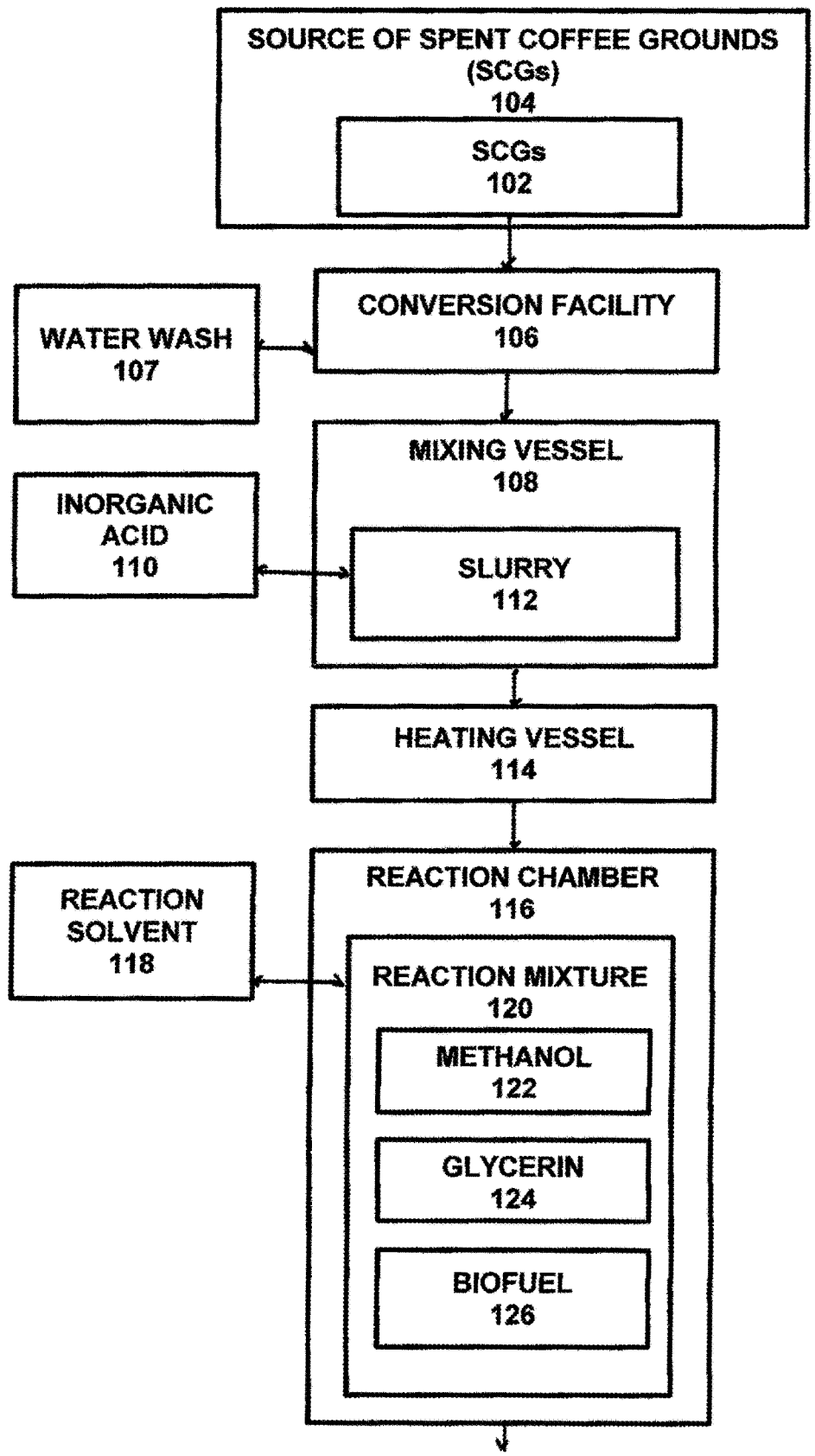
FIG. 8A is a flow diagram showing the system of the subject invention having a first operation for obtaining a lipid content from SCGs to produce biofuel.
Figure 8B:
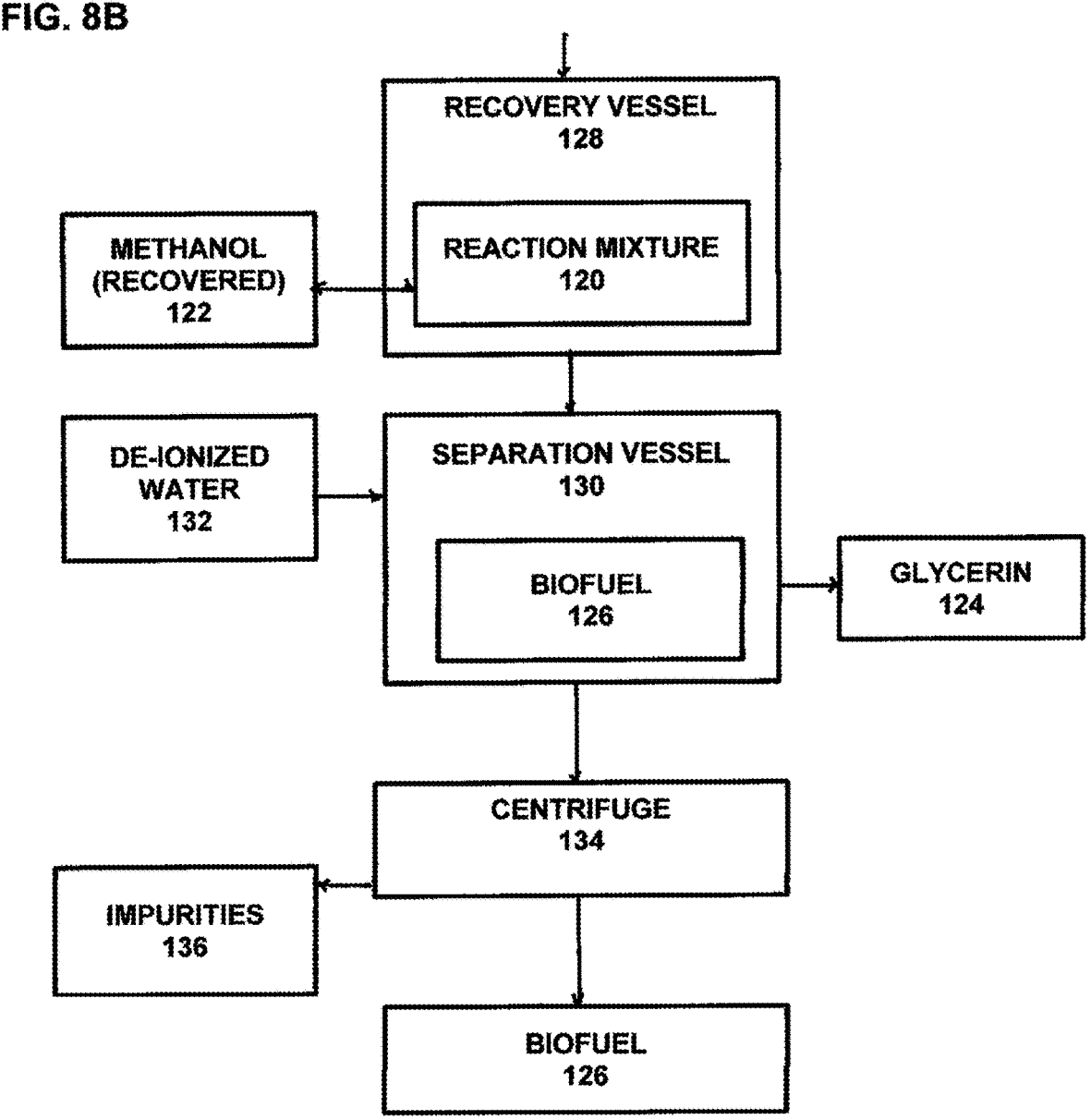
FIG. 8B is a flow diagram showing the system of the subject invention having a first operation for obtaining a lipid content from SCGs to produce biofuel.
Figure 9A:
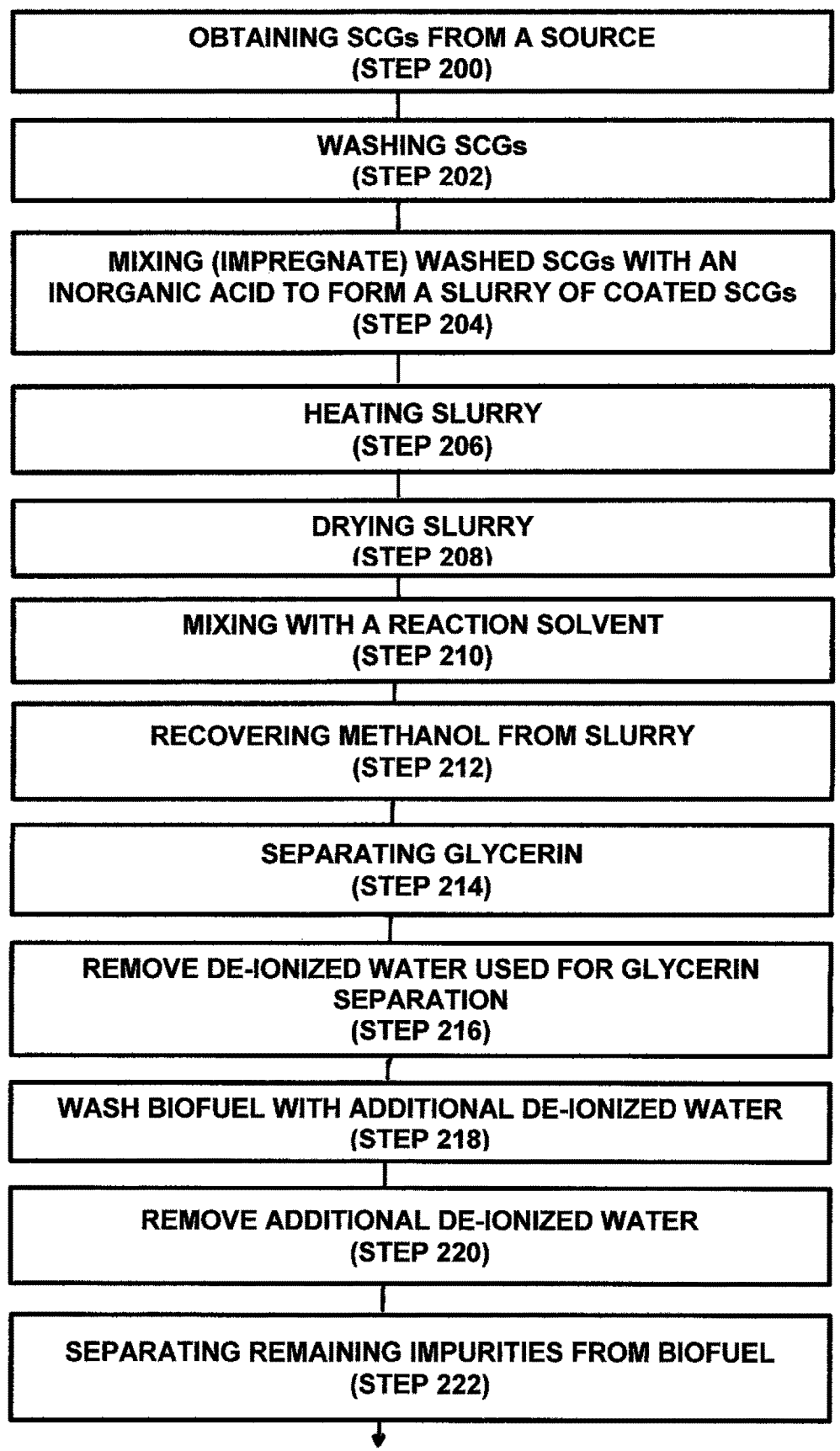
FIG. 9A is a flow diagram showing the process of the subject invention, showing the steps of a first operation for producing biofuel from SCGs.

Referring to FIGS. 7-9, the first operation 100 of the process for producing bio-products from spent coffee grounds (SCGs) is shown comprising the steps of obtaining SCGs 102 from a source 104 (Step 200) and delivering them to a conversion facility 106. The delivered SCGs 102 are washed (Step 202), such as by a water wash 107, and are placed within a mixing vessel 108 and are mixed (impregnated) with an inorganic acid 110 (Step 204), such as sulfuric acid, to form a slurry 112 of coated SCGs. Preferably, the sulfuric acid is diluted such as by de-ionized water to form a 20 wt. % sulfuric acid. It should be understood that other inorganic acids 110 may be utilized from the list consisting of hydrochloric acid (HCl), nitric acid ($HNO_3$), and other organic acidic heterogeneous catalysts. The slurry 112 is heated (Step 206), such as in a heating vessel 114, and then dried (Step 208). Preferably, the slurry 112 is heated in the heating vessel to about 70° C. for a period of about 3-about 4 hours and then dried at a temperature of about 105° C. for about 24 hours to remove moisture from the slurry 112. After the slurry 112 has been dried, the dried slurry is placed into a reaction chamber 116 and mixed with a reaction solvent 118 (Step 210), such as methanol, for transesterification, to create a reaction mixture 120 of methanol 122, glycerin 124 and biofuel 126. The reaction mixture 120 is then transported to a recovery vessel 128, such as a rotary evaporator, for methanol recovery (Step 212). Preferably, the reaction vessel 128 operates to heat the reaction mixture to a temperature of about 70° C. and provide a moderate vacuum environment for evaporating the methanol 122 which is then cooled and reclaimed for reuse. After the methanol 122 has been removed from the reaction mixture 120, the remaining reaction mixture is then placed into a separation vessel 130 and is mixed with de-ionized water 132 allowed to settle for glycerin separation (Step 214). Preferably, the de-ionized water 132 is pre-heated to about 70° C. and allowed to settle for about 30 minutes. After sufficient time to settle, the glycerin 124 and de-ionized water 132 are drained out (Step 216). The biofuel 126 remaining in the separation vessel 130 is washed with an additional amount of de-ionized water 132 (Step 218) to wash the biofuel 126. It should be understood that the amount of additional de-ionized water 132 should be sufficient for ensuring that the pH of the additional de-ionized water is the same as the initial deionized water. The additional de-ionized water 132 is then removed (Step 220) and the washed biofuel 126 is transferred into a centrifuge 134 to separate any remaining impurities 136, such as any remaining de-ionized water and any fine SCG particles (Step 222).

Figure 10:
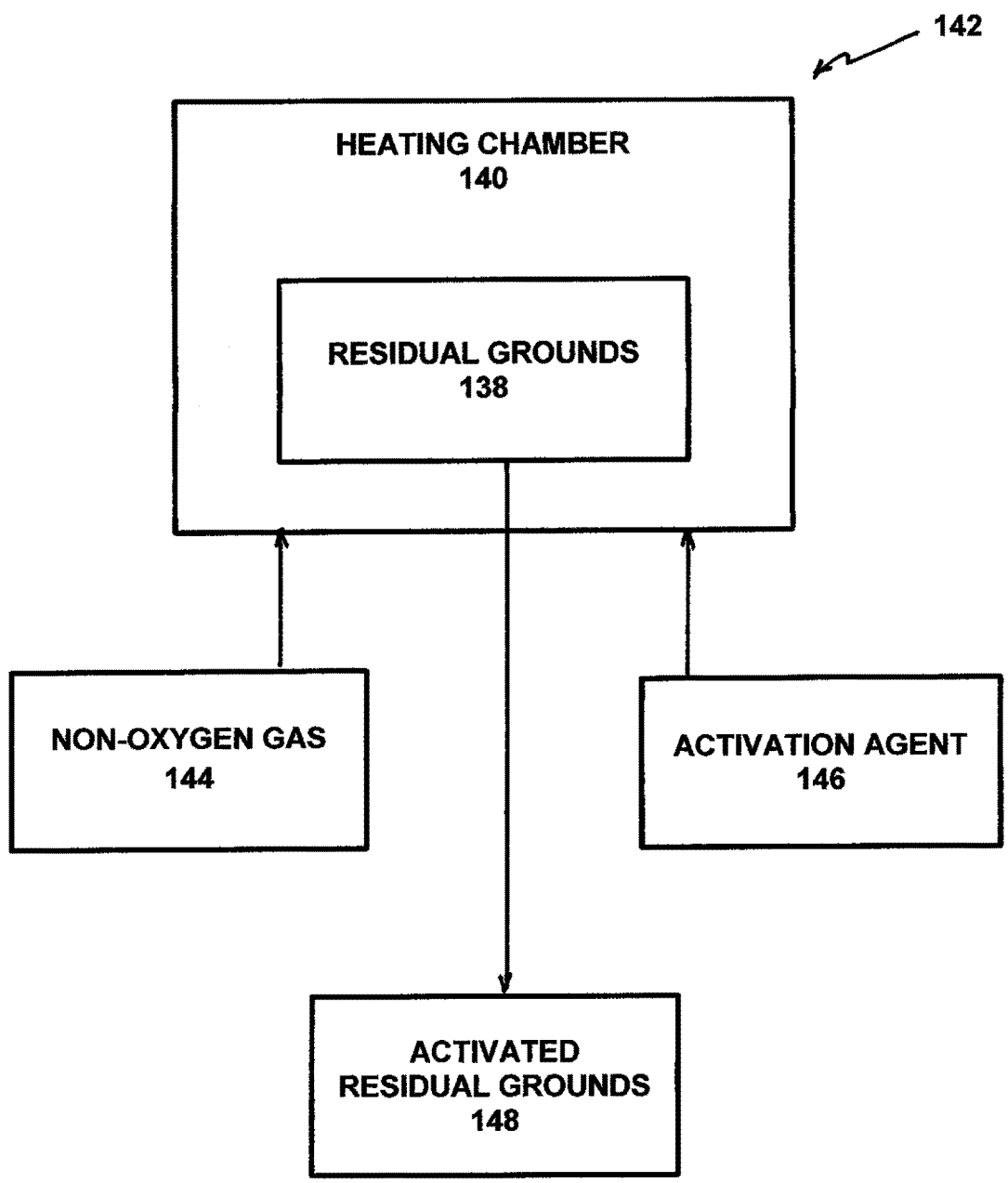
FIG. 10 is a flow diagram showing the system of the subject invention having a second operation for creating activated grounds (SCG-activated carbon)
Figure 11:
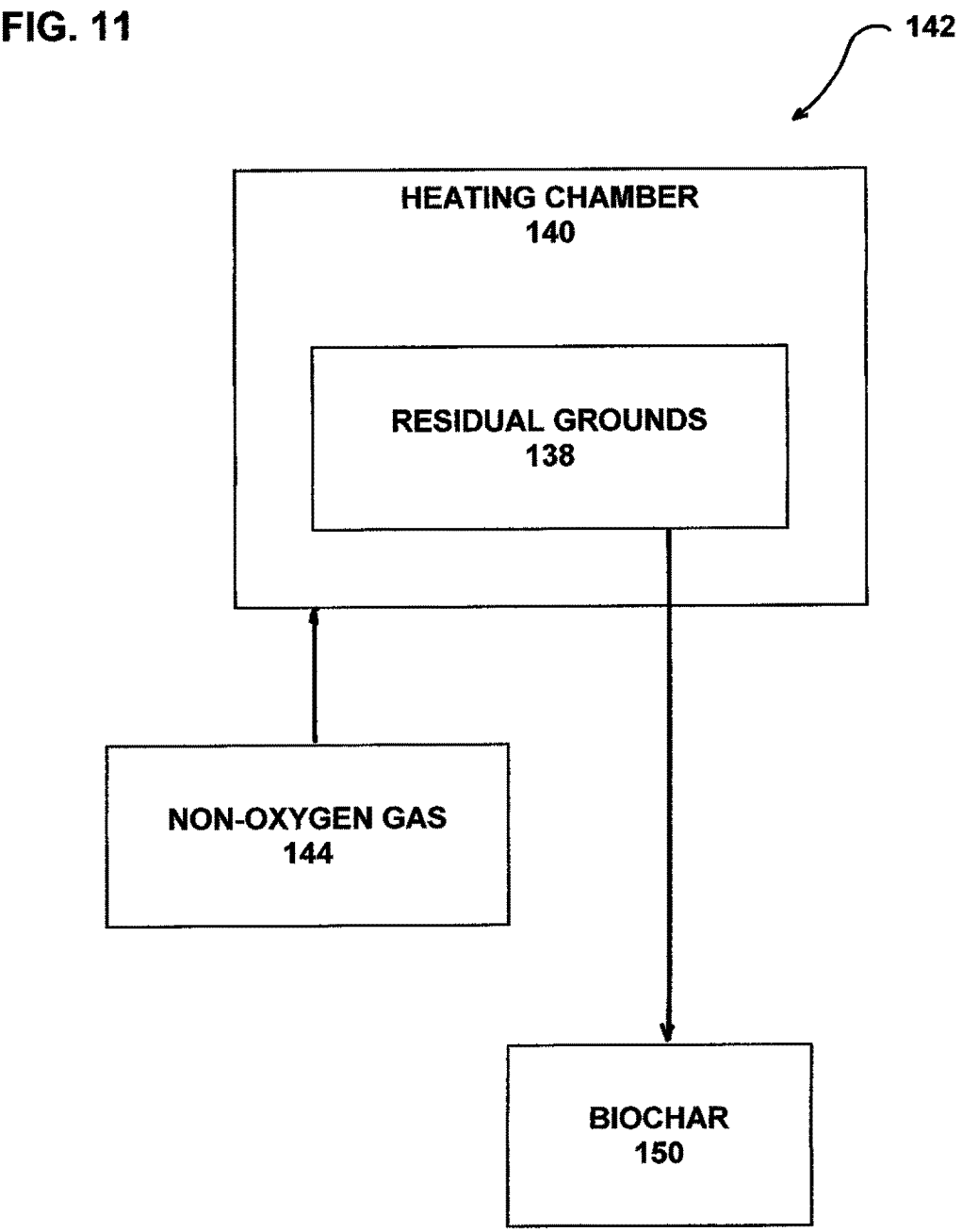
FIG. 11 is a flow diagram showing the system of the subject invention having a second operation for creating biochar.

Referring to FIGS. 9B, 10 and 11 the second operation 140 of the process for producing biofuel from spend coffee grounds is shown for producing activated residual grounds for producing carbon products, such as biochar or activated carbon, specialized for mercury control. The residual grounds 138 (waste solids—the material remaining after glycerin and biofuel is separated from the reaction mixture) are placed into a heating chamber 142, such as a tube furnace, for heating the residual grounds 138 and a non-oxygen gas 144, such as nitrogen, is blown into the heating chamber 142 to create a pyrolysis environment (to drive off oxygen) (Step 224). To produce activated residual grounds 148, as shown in FIG. 10, which is not required for producing biochar 150 (FIG. 11) an activation agent 146, such as carbon dioxide or water vapor, is injected into the heating chamber 142, such as by a carrier gas, and heated to cause chemical activation (Step 226) producing activated residual grounds (SCG-activated carbon) 148. It should be understood that in a preferred embodiment of the invention one or more activation agents selected from the list consisting of carbon dioxide ($CO_2$), water vapor and nitrogen ($H_2o$ and $N_2$), zinc chloride ($ZnCl_2$), phosphoric acid ($H_3PO_4$), nitric acid ($HNO_3$) and hydrochloric acid (HCl) may be utilized an activation agent. The heating chamber is preferably heated to about 800-1000° C. for about 30 minutes to about 2-4 hours. Preferably, higher temperature pyrolysis is used to produce larger surface area but with a lower yield. After chemical/physical activation, the activated residual grounds 148, and/or the biochar 150, are cooled (Step 228) and the cooled activated residual grounds (SCG-activated carbon) 148 and/or the biochar 150 are collected for use (Step 230).

The process of the subject invention is a new and novel system and process that operates to produce biofuel from SCGs that does not require the need to produce coffee oil since the coffee oil is consumed for biofuel during the reaction steps thereby reducing time and expense. Unlike prior art processes where solvent extraction is followed by a two-step process of first esterification of free fatty acids in the SCGs using acid catalysts, such as sulfuric acid, to convert the free fatty acids to esters, and a second step of transesterification of the glycerides into esters (biofuel) using alkaline catalysts, NaOH, KOH, or methoxides. The process of the subject invention is an acid catalyzed transesterification process, using just an acid catalyst in a single step. Thus, the process of the subject invention significantly reduces the expense of the prior art processes. It should also be understood that the solvent extraction process, oil and solids are separated after solvent extraction, thus, solids remain. During the process of the subject invention, the solids have been mixed (coated) with sulfuric acid. The added sulfate operates to enhance its functions as biochar or activated carbon.

It should also now be apparent to one skilled in the art that the three-step process (solvent extraction, esterification and transesterification) required in prior art systems to make biofuel from spent coffee grounds is relatively costly to utilize in large scale production. In contract the direct transesterification process of the subject invention produces biofuel from spent coffee grounds without the need of oil extraction by combining esterification, and transesterification into a two-step process to directly produce biofuel thereby significantly reducing production costs. The process, as shown in FIG. 7 directly uses a new and novel process using transesterification to directly obtain biofuel from SCGs without the solvent extraction and esterification steps to produce coffee oil of the prior art process, as shown in FIG. 1. Thus, solvent the step of solvent extraction and subsequent solvent recovery is eliminated.

The invention claimed is:

1. A process for producing biofuel from spent coffee grounds (SCGs) comprises the steps of:
    performing a first operation comprising the steps of
        obtaining spent SCGs from a source;
    washing the SCGs;
    mixing the washed SCGs with an inorganic acid and heating and stirring the washed SCGs to form a SCG slurry without separating coffee oil;
    drying the SCG slurry;
    mixing the dried slurry with a solvent and heating the dried slurry and solvent mixture to create a reaction that produced biofuel and residual grounds; and
    separating the biofuel from the solvent and the residual grounds.

2. The process of claim 1 wherein the inorganic acid is sulfuric acid.

3. The process of claim 1 wherein the inorganic acid is 20 wt. % sulfuric acid.

4. The process of claim 1 further comprising the steps of using the residual grounds to produce biochar and/or activated carbon.

5. The process of claim 1 wherein the inorganic acid is selected from the list consisting of hydrochloric acid (HCl), nitric acid ($HNO_3$), and organic acidic heterogeneous catalysts.

6. The process of claim 1 wherein the dried slurry and solvent is heated in the reactor of about 70° C. for about 6-about 20 hours.

7. The process of claim 1 wherein the solvent is methanol.

8. A process for producing biofuel from spent coffee grounds (SCGs) comprising the steps of:
    obtaining spent SCGs from a source;
    washing the SCGs;
    mixing the washed SCGs without separating coffee oil from the SCGs with sulfuric acid and stirring and heating to form a slurry;
    drying the slurry;
    mixing the dried slurry with methanol as a solvent and heating to create a reaction for producing biofuel and residual grounds;
    separating the biofuel from the methanol and residual grounds; and
    purifying the biofuel.

9. The process of claim 8 further comprising the step of heating the residual grounds to produce activated residual grounds.

10. The process of claim 8 further comprising the steps of removing the solvents from the residual grounds using natural evaporation, heating or by use of blowing air.

11. The process of claim 8 further comprising the step of heating an activation agent and the residual grounds in a non-oxygen gas environment to remove any solvents from the residual grounds to create a pyrolysis environment and then cooling to produce activated residual grounds.

12. The process of claim 9 further comprising the step of using an activation agent to produce the activated coffee grounds.

13. The process of claim 9 wherein the activation agent is one or more activation agents selected from the list consisting of carbon dioxide, water vapor and nitrogen, zinc chloride, phosphoric acid, nitric acid and hydrochloric acid.

14. The process of claim 8 wherein the residual grounds are heated to produce biochar.

15. A process for producing biofuel from spent coffee grounds (SCGs) comprises the steps of:
    performing a first operation comprising the steps of
        obtaining spent SCGs from a source;
    washing the SCGs;
    mixing the washed SCGs with an inorganic acid and heating and stirring the washed SCGs to form a SCG slurry without separating coffee oil;
    drying the SCG slurry;
    mixing the dried slurry with a solvent and heating the dried slurry and solvent mixture to create a reaction that produced biofuel and residual grounds; and
    separating the biofuel from the solvent;
    wherein said solvent is methanol; and
    wherein the inorganic acid is selected from the list consisting of sulfuric acid, hydrochloric acid, nitric acid, and organic acidic heterogeneous catalysts.

16. The process of claim 15 wherein the inorganic acid is 20 wt. % sulfuric acid.

17. The process of claim 15 wherein the inorganic acid is a 20 wt. % sulfuric acid and the mixture of SCGs and inorganic acid is heated to about 70° C. for about 6-about 20 hours.

18. The process of claim 15 further comprising the step of using an activation agent and heating the residual grounds and the activation agent to cause a chemical reaction to create activated residual grounds.

19. The process of claim 15 wherein the activation agent is one or more activation agents selected from the list consisting of carbon dioxide, water vapor and nitrogen, zinc chloride, phosphoric acid, nitric acid and hydrochloric acid.

* * * * *